United States Patent
Machida et al.

(10) Patent No.: US 6,318,083 B1
(45) Date of Patent: Nov. 20, 2001

(54) INTAKE AIR CONTROL DEVICE OF AN ENGINE WITH A CHARGER AND METHOD THEREOF

(75) Inventors: Kenichi Machida, Atsugi; Toru Fuse, Yokohama; Takao Kawasaki, Yamato, all of (JP)

(73) Assignees: Unisia Jecs Corporation, Kanagawa-Ken; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/666,891

(22) Filed: Sep. 20, 2000

(30) Foreign Application Priority Data

Sep. 20, 1999 (JP) .................................... 11-265802

(51) Int. Cl.⁷ .................................................. F02D 23/00
(52) U.S. Cl. .................................. 60/601; 60/603; 60/611
(58) Field of Search .............................. 60/598, 600, 601, 60/602, 603, 611; 123/559.1

(56) References Cited

U.S. PATENT DOCUMENTS

| | | | |
|---|---|---|---|
| 4,633,670 | * | 1/1987 | Iwasa ........................................ 60/603 |
| 4,774,812 | * | 10/1988 | Hitomi et al. ...................... 60/601 X |
| 5,187,935 | * | 2/1993 | Akiyama et al. .................. 60/601 X |

FOREIGN PATENT DOCUMENTS 62-110536    5/1987   (JP) .

* cited by examiner

*Primary Examiner*—Hoang Nguyen
(74) *Attorney, Agent, or Firm*—McDermott, Will & Emery

(57) ABSTRACT

An engine with a charger, in which an intake passage is provided with a throttle valve which is electronically controlled to a target opening degree and the charger on the upstream side of the throttle valve, wherein a target supercharged pressure is corrected in a direction of eliminating a delay in the intake air amount based upon a difference between the target supercharged pressure of the charger and the supercharged pressure detected on the upstream side of the throttle valve, to thereby set a target supercharged pressure of the throttle valve based on the corrected target supercharged pressure. This suppresses a delay in the intake air amount caused by a delay in the change of the supercharged pressure during the transient period, makes it possible to accomplish acceleration/deceleration performance of good response, and suppresses a torque difference that occurs when the combustion system is changed over to the stratified charge combustion or to the homogeneous combustion.

19 Claims, 4 Drawing Sheets

INTAKE AIR CONTROL DEVICE OF AN ENGINE WITH A CHARGER AND METHOD THEREOF

BACKGROUND OF THE INVENTION

1. Field of the Invention

The present invention relates to technology for improving transient response characteristics of supercharged pressure in an engine equipped with a charger and a throttle valve of which opening degree is electronically controlled.

2. Related Art of the Invention

There has heretofore been proposed a device for controlling an intake air amount by an engine equipped with a throttle valve of which opening degree is electronically controlled as disclosed in, for example, Japanese Unexamined Patent Publication No. 62-110536.

According to this device, the throttle valve is controlled by calculating a target torque of the engine based upon an accelerator opening degree and an engine rotational speed, and calculating a target throttle valve opening degree based upon the above target torque and the engine rotational speed to obtain a target intake air amount.

In electronically controlling the throttle valve of the engine equipped with a charger for supercharging intake air, it is possible to adjust the target throttle valve opening degree for the target intake air amount corresponding to the supercharged pressure that is variably controlled depending upon the operation conditions, which, however, is not enough for quickly changing the intake air amount due to a delay in the change of the supercharged pressure during the transient period in which the supercharged pressure is changing depending upon a change in the operation conditions. Therefore, it is not possible to control the intake air amount to meet the requirement. In an engine in which the stratified charge combustion and the homogeneous combustion are changed over to each other depending upon the operation conditions, in particular, the supercharged pressure for producing the same torque differs depending upon the respective combustions, giving the occurrence of a torque difference at the time of changing over the combustion.

SUMMARY OF THE INVENTION

The present invention was accomplished by giving attention to the above problem inherent in the prior art, and its object is to suppress a delay in an intake air amount caused by a delay in the change of the supercharged pressure during the transient period to so control the intake air amount as to meet the requirement, by suitably controlling the opening degree of a throttle valve.

Another object of the invention is to improve response characteristics of acceleration/deceleration performance by controlling the intake air amount while suppressing the delay.

A further object of the invention is to suppress a torque difference that occurs when the stratified charge combustion and the homogeneous combustion are changed over to each other by controlling the intake air amount while suppressing the delay.

A still further object of the invention is to control the intake air amount in a software manner without adding any particular hardware.

A yet further object of the invention is to maintain a good accelerator operability for a driver even when the atmospheric pressure has decreased such as when the vehicle is traveling at a high altitude, relying upon a modified embodiment of the control system.

In order to accomplish the above-mentioned objects, the present invention is constituted such that, in an engine with a charger in which an intake passage is provided with a throttle valve which is electronically controlled to a target opening degree and the charger on the upstream side of the throttle valve, a target supercharged pressure of the charger is set, a supercharged pressure on the upstream side of the throttle valve is detected, the target supercharged pressure is corrected in a direction of eliminating a delay in the intake air amount based upon a difference between the target supercharged pressure that has been set and the real supercharged pressure that is detected, and a target opening degree of the throttle valve is set based on the corrected target supercharged pressure.

Then, the target supercharged pressure is corrected in a direction of eliminating a delay in the intake air amount that is caused by a delay in the change of the supercharged pressure corresponding to a difference between the target supercharged pressure and the real supercharged pressure, and the opening degree of the throttle valve is corrected based upon the corrected target supercharged pressure.

This suppresses a delay in the intake air amount for a delay in the change of the supercharged pressure during the transient period, and makes it possible to quickly obtain a target intake air amount and, hence, to obtain acceleration/deceleration performance maintaining good response.

Further, the target supercharged pressure may be corrected based upon a deviation or a ratio between the target supercharged pressure and the real supercharged pressure.

Then, the target supercharged pressure can be easily corrected in a direction of eliminating the delay in the intake air amount based upon the deviation or the ratio between the target supercharged pressure and the real supercharged pressure.

The correction of the target supercharged pressure may be stopped when the difference (for example, deviation) between the target supercharged pressure and the real supercharged pressure becomes equal to or smaller than a set value.

The real supercharged pressure fluctuates at all times even in a steady state due to pulsation caused by the turbine, the suction and the like. When the target supercharged pressure is corrected in response thereto, then, the throttle valve must be moved at all times, resulting in further deterioration of the durability of the throttle valve.

Durability deterioration of the throttle valve can be suppressed by stopping the correction of the target supercharged pressure when the difference becomes equal to or smaller than the set value.

Further, an estimated supercharged pressure may be calculated based upon a change in the real supercharged pressure, to correct the target supercharged pressure based upon a difference between the target supercharged pressure and the estimated supercharged pressure.

In the system that corrects the target supercharged pressure based on a deviation or a ratio between the target supercharged pressure and the real supercharged pressure, a deviation (steady deviation) occurs between the target supercharged pressure and the real supercharged pressure when the atmospheric pressure decreases such as when the vehicle is traveling at a high altitude, even though the supercharged pressure is in an equilibrium state. If the throttle valve opening degree is corrected by correcting the target supercharged pressure even for the above deviation, then, the range in which the throttle valve can be controlled by a driver becomes narrow (output reaches a maximum before the accelerator is opened to a maximum degree), which is not desirable from the standpoint of operation.

Therefore, a change in the supercharged pressure during the transient period under the standard atmospheric pressure condition is estimated by using a rate of change without using an absolute value of the real supercharged pressure, and the target supercharged pressure is corrected based on the difference between the estimated supercharged pressure and the target supercharged pressure to eliminate steady deviation so that a good operability can be maintained by inhibiting the correction of the throttle valve opening degree for the steady deviation (the control range for the driver can be maintained so that a maximum output is obtained at a maximum accelerator opening degree).

The correction of the target supercharged pressure may be stopped when the difference (for example, deviation) between the target supercharged pressure and the estimated supercharged pressure becomes equal to or smaller than a set value.

Because of the same reasons as those of when the target supercharged pressure and the real supercharged pressure were used, the correction of the target supercharged pressure is stopped when the deviation between the target supercharged pressure and the estimated supercharged pressure becomes equal to or smaller than a set value to prevent the durability deterioration of the throttle valve.

The invention can be further applied to an engine in which the homogeneous combustion and the stratified charge combustion are changed over to each other for the respective combustion systems, and further, the target supercharged pressure of before being corrected may be set by being changed over for every combustion system.

In this way, by setting the target supercharged pressure for every combustion system such as homogeneous stoichiometric combustion, homogeneous lean combustion, or stratified charge lean combustion, it is possible to accomplish a supercharged pressure that meets any of the combustion systems, a change in the supercharged pressure caused by the change over of these combustion systems can be suppressed by correcting the target supercharged pressure, thereby suppressing the torque shock.

The target supercharged pressure of before being corrected may be set based upon the engine load and the engine rotational speed.

This makes it possible to set the target supercharged pressure of before being corrected depending upon the basic operation conditions of the engine.

The target supercharged pressure of before being corrected may be set by delaying the basic target supercharged pressure obtained from the engine operation conditions.

This makes it possible to set the target supercharged pressure that meets acceleration/deceleration performance desired by the driver.

DESCRIPTION OF THE PREFERRED EMBODIMENT

An embodiment of the invention will now be described with reference to the drawings.

Figure 1:
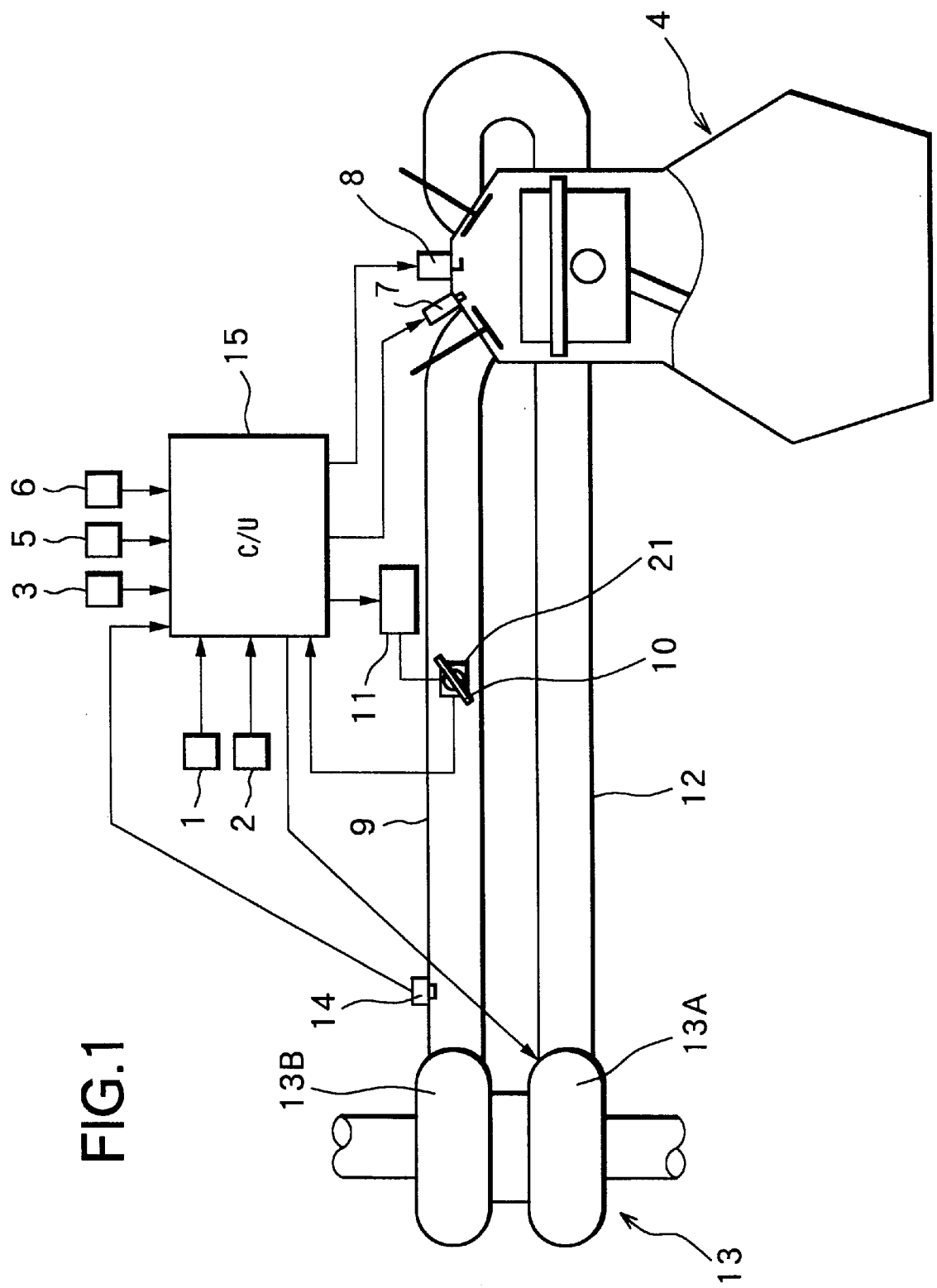
FIG. 1 is a diagram illustrating a system constitution of an embodiment of the present invention.

Referring to FIG. 1 illustrating the system constitution of the embodiment of the invention, an accelerator opening degree sensor 1 detects the amount of operation of the accelerator pedal (accelerator opening degree) depressed by a driver.

A crank angle sensor 2 generates a position signal for every unit crank angle and a reference signal for every phase difference in the cylinder stroke. By measuring the number of times of generation of the position signals per a unit time or measuring the period of occurrence of the reference signals, it is possible to detect the engine rotational speed.

An air flow meter 3 detects an intake air amount (per a unit time) to an engine 4.

A water temperature sensor 5 detects a temperature of the cooling water of the engine 4.

An air-fuel ratio sensor 6 detects an air-fuel ratio of the air-fuel mixture supplied to the engine relying upon the oxygen component or the like in the exhaust gas.

The engine 4 is provided with a fuel injection valve 7 which is driven by a fuel injection signal to inject fuel directly into a combustion chamber and a spark plug 8 which is mounted in the combustion chamber to execute the ignition. According to the system for directly injecting fuel into the combustion chamber, it becomes possible to make the mixture lean by the stratified charge combustion, to thereby variably control the air-fuel ratio (equivalence ratio) over a wide range. The operation is conducted by changing the combustion over to the homogeneous combustion depending upon the water temperature, load condition and the like.

In an intake passage 9 of the engine 4 is disposed a throttle valve 10 and a throttle valve control unit 11 for electronically controlling the opening degree of the throttle valve 10 by a DC motor or the like. An exhaust gas turbocharger 13 is mounted with its turbine unit 13A being interposed in an exhaust passage 12 of the engine 4 and with its compressor unit 13B being interposed in the intake passage 9. The turbocharger 13 has a movable vane for variably squeezing the turbine inlet area of the turbine unit 13A. The squeezing amount of the movable vane is controlled by an actuator to increase or decrease the supercharged pressure.

There is further provided a supercharged pressure sensor 14 for detecting the supercharged pressure on the downstream side of the compressor 13B of the turbocharger 13 (on the upstream side of the throttle valve 10).

Detection signals from the above-mentioned sensors are input to a control unit 15. Depending upon the operation conditions detected based upon signals from the sensors, the control unit 15 controls the opening degree of the throttle valve 10 via the throttle valve control unit 11, drives the fuel injection valve 7 to control the amount of fuel injection (amount of supplying fuel), sets the ignition timing to execute the ignition control of the spark plug 8 at the ignition timing, and controls the supercharged pressure of the turbocharger 13 by controlling the movable vane of the turbocharger 13.

Figure 2:
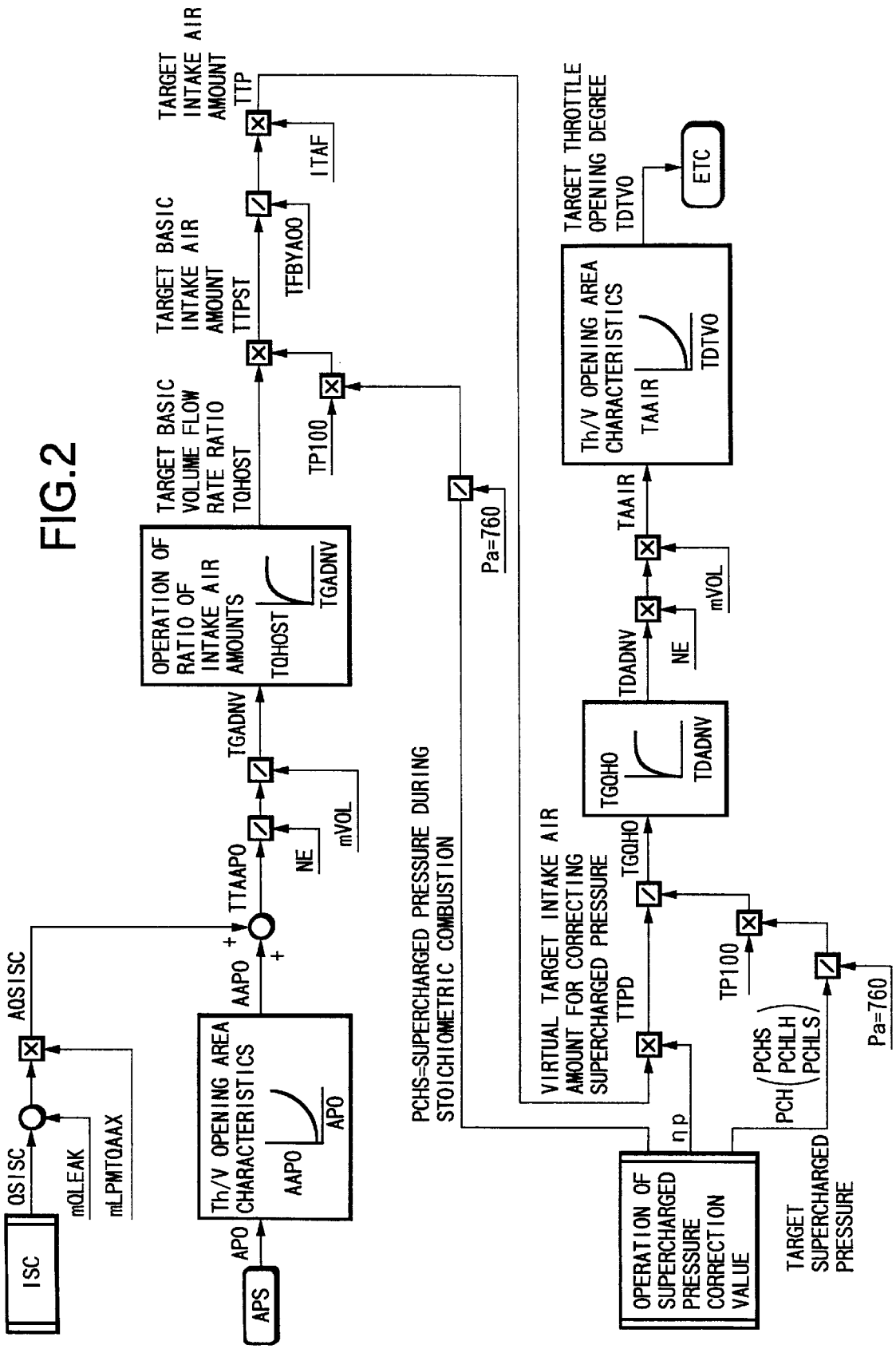
FIG. 2 is a block diagram illustrating the functional constitution of the above embodiment.

Described below with reference to a block diagram of FIG. 2 is the operation for controlling the opening degree of the throttle valve depending upon the pressure (supercharged pressure) on the upstream side of the throttle valve of the engine with a charger constituted as described above.

First, a target intake air amount is calculated as described below.

The opening area AAPO of the throttle valve corresponding to the accelerator opening degree APO detected by the accelerator opening degree sensor 1, is calculated by the retrieval from a map. Then, a value obtained by adding up an air amount QSISC calculated from the idling rotational speed control (ISC) and the leaking air amount mQLEAK of when the throttle valve is fully closed, is multiplied by the air amount/throttle opening area conversion coefficient mLPMTQAAX, to calculate a throttle opening area AQSISC corresponding to ISC. Then, AAPO and AQSISC are added up to calculate a target throttle opening area TTAAPO (see the following formula), $$TTAAPO=AAPO+(QSISC+mQLEAK)\times mLPMTQAAX=AAPO+AQSISC.$$

The target throttle opening area TTAAPO is successively divided by the engine rotational speed NE and displacement (total cylinder capacity) mVOL to calculate a volumetric efficiency index TGADNV. A target basic volume flow rate ratio TQH0ST is calculated based on the TGADNV, $$TGADNV=TTAAPO/NE/mVOL$$

$$TGADNV \rightarrow TGH0ST.$$

The target basic volume flow rate ratio TQH0ST is obtained as a ratio of the intake air amount to the intake air amount of when the throttle valve is fully opened, and has a characteristic of increasing to approach 1 with an increase in the TGADNV.

The target basic intake air amount TTPST is calculated by multiplying the above target basic volume flow rate ratio TQH0ST by a basic equivalence ratio (value corresponding to stoichiometric air-fuel ratio=1) of when the throttle valve is fully opened. That is, the intake air amount by the cylinder when the throttle valve is fully opened in a state where the supercharged pressure PCHS corresponding to the engine rotational speed NE at the homogeneous stoichiometric combustion (homogeneous combustion at the stoichiometric air-fuel ratio) and the target torque is being generated, is calculated by multiplying the intake air amount TP100 by the cylinder when the throttle valve is fully opened in the state of standard atmospheric pressure Pa (=760 mmHg) without supercharging by a ratio (PCHS/Pa) of the supercharged pressure PCHS during the stoichiometric combustion to the atmospheric pressure Pa. The thus calculated intake air amount by the cylinder is multiplied by the above target basic volume flow rate ratio TQH0ST (see the following formula) to thereby obtain the target basic intake air amount TTPST, $$TTPST=TQH0ST\times TP100\times PCHS/Pa.$$

Further, since the target equivalence ratio TFBYA00 is variably controlled based upon the engine operation conditions, the target basic intake air amount TTPST corresponding to the basic equivalence ratio is divided by the target equivalence ratio TFBYA00 and is, then, multiplied by a combustion efficiency correction coefficient ITAF that is set based upon the combustion efficiency that varies depending upon the equivalence ratio, thereby to calculate the target intake air amount TTP corresponding to the target equivalence ratio (see the following formula). Here, since the combustion efficiency ITAF is high and fuel is consumed in a smaller amount when a lean burn is taking place with a small equivalence ratio, the combustion efficiency ITAF is set to a small value (<1) to decrease the amount of the air, $$TTP=TTPST/TFBYA00\times ITAF.$$

For the target intake air amount TTP that is set as described above, the target throttle valve opening degree TDTVO is calculated to obtain the target intake air mount TTP at a target supercharged pressure corresponding to the accelerator opening degree, and the transience correction is executed to quickly obtain a target intake air amount TTP0 even for a delay in the change of the supercharged pressure during the transient period in which the target supercharged pressure changes due to a change in the accelerator opening degree.

Figure 3:
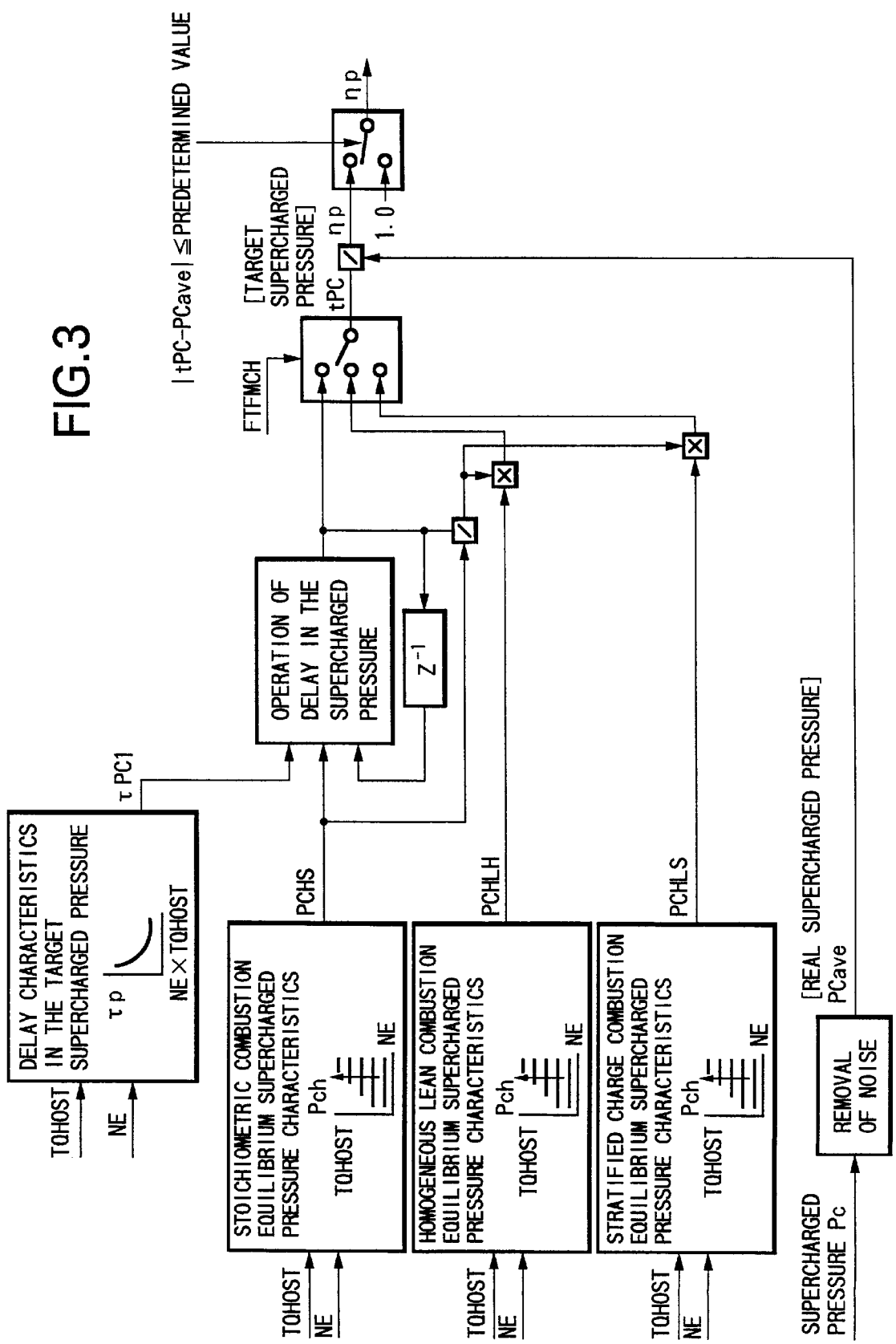
FIG. 3 is a block diagram illustrating a first example of controlling the transience correction according to the embodiment.

A first example of controlling the transience correction will now be described with reference to a block diagram of FIG. 3.

First, the target supercharged pressure PCH is weight average-operated in time series and is delayed to obtain a desired acceleration/deceleration performance, thus tPC is obtained (see the following formula), $$tPC=PCH\times \tau PC+tPC(\text{old})\times(1-\tau PC).$$

Here, the target supercharged pressure PCH is obtained by the retrieval from a map based upon the target basic volume flow rate ratio TQH0ST corresponding to the engine load and the engine rotational speed NE, and is calculated separately for the homogeneous stoichiometric combustion (PCHS), homogeneous lean combustion (PCHLH) or stratified charge lean combustion (PCHLS). The weighing coefficient τPC, too, is obtained by the retrieval from the map based on a product of the target basic volume flow rate ratio TQH0ST and the engine rotational speed NE. In practice, a ratio of the latest value and the previous value of the target supercharged pressure (PCHS) during the homogeneous stoichiometric combustion, is calculated to be stored, and the target supercharged pressures (PCHLH, PCHLS) of during the homogeneous lean combustion and the stratified charge lean combustion are delayed by using the above ratio. The delay-processing values corresponding to the respective combustions are selected based on a value of the flag FTFMCH.

Next, the thus delayed target supercharged pressure tPC obtained as described above is divided by the real supercharged pressure PCave obtained by removing noise from the detection signal Pc of the supercharged pressure sensor 14 to calculate a supercharged pressure correction value ηp for the target supercharged pressure tPC.

Further, a deviation |tPC−PCave| between the target supercharged pressure tPC and the real supercharged pressure PCave is calculated. When the deviation becomes equal to or smaller than a predetermined value, the supercharged pressure correction value is set to be ηp=1 to stop the transience correction in the target supercharged pressure.

Reverting to FIG. 2, the supercharged pressure correction value ηp is multiplied by the target intake air amount TTP to calculate the virtual target intake air amount TTPD, $$TTPD=TTP\times \eta p.$$

The throttle valve opening degree is controlled with the supercharged pressure correction virtual target intake air amount TTPD as a target value.

That is, the virtual target intake air amount TTPD is divided by a value obtained by multiplying the intake air amount TP100 by the cylinder when the throttle valve is fully opened under the atmospheric pressure by a ratio PCH/Pa of the target supercharged value PCH to the standard atmospheric pressure Pa; i.e., the virtual target intake air amount TTPD is divided by the intake air amount by the cylinder when the throttle valve is fully opened under the target supercharged pressure PCH, to calculate the volume flow rate ratio TGQH0 under the target supercharged pressure PCH. Then, the volumeric efficiency value TDADNV is obtained by the retrieval from the map based on the volume flow rate ratio TGQH0. The value TDADNV is multiplied by the engine rotational speed NE and the displacement mVOL successively to calculate a target throttle valve opening area TAAIR. The target throttle valve opening area TAAIR is converted into a target throttle valve opening degree TDTVO, and the opening degree of the throttle valve is controlled so as to accomplish the target throttle valve opening degree TDTVO (see the following formulas), $$TGQH0 = TTPD \times TP100 \times PCH/Pa$$

$$TGQH0 \rightarrow TDADNV$$

$$TAAIR = TDADNV \times NE \times mVOL$$

$$TAAIR \rightarrow TDTVO.$$

To cope with the delay in the real supercharged pressure (so-called turbo lag) for a change in the target supercharged pressure, therefore, the throttle valve opening degree is controlled for the virtual target intake air amount obtained by correcting the target intake air amount by a correction value that corresponds to a difference between the target supercharged pressure and the real supercharged pressure. Thus, the target intake air amount is quickly obtained without affected by the delay, and a delay in the response is prevented.

As a result, there is obtained a torque response that meets the requirement at the time of acceleration or deceleration, and a change in the torque is suppressed at the time of changing over the homogeneous combustion and the stratified charge combustion.

When the difference |tPC−PCave| between the target supercharged pressure tPC and the real supercharged pressure PCave is equal to or smaller than a predetermined value, the execution of the correction of the target supercharged pressure is stopped. Thus, it can be avoided that the throttle valve that is constantly operated by the correction of the target supercharged pressure relative to the supercharged pressure that constantly fluctuates due to pulsation caused by the turbine and the suction and, hence, makes it possible to prevent the durability deterioration of the electronically controlled throttle valve.

Figure 4:
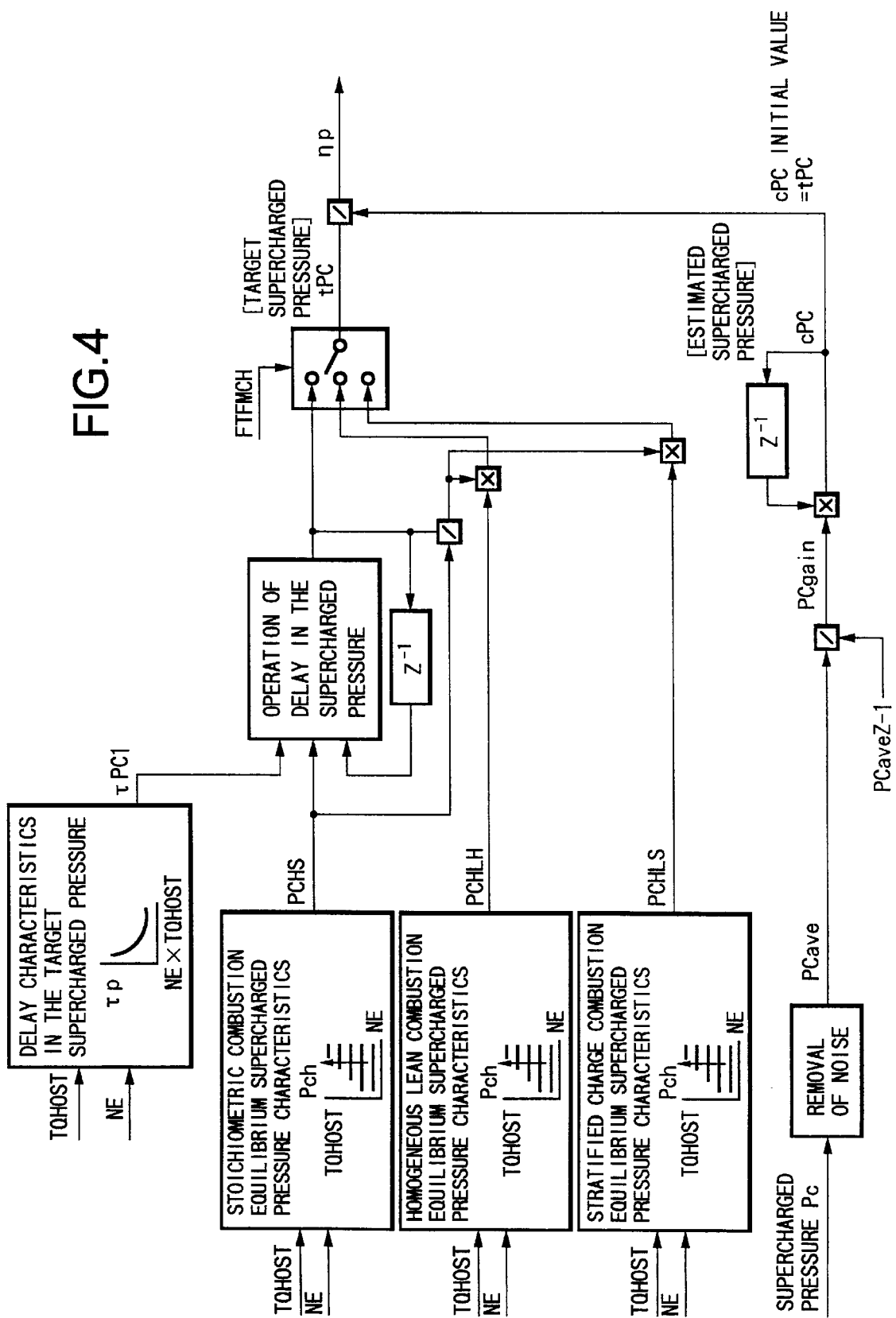
FIG. 4 is a block diagram illustrating a second example of controlling the transience correction according to the embodiment.

Next, a second example of controlling the transience correction will be described in detail with reference to a block diagram of FIG. 4. Here, the software is different from that of the first example of control but the hardware is the same as that of FIG. 1.

According to the system that corrects the target supercharged pressure based upon a difference between the target supercharged pressure and the real supercharged pressure as in the above-mentioned first control, if the atmospheric pressure decreases such as when traveling at a high altitude, a deviation (steady deviation) occurs between the target supercharged pressure and the real supercharged pressure even when the supercharged pressure is in an equilibrium state.

According to the second control, therefore, a change due only to a transient delay in the real supercharged pressure is estimated eliminating the effect that is caused by a change in the atmospheric pressure, and the target supercharged pressure is corrected based on the difference between the estimated supercharged pressure and the target supercharged pressure.

Calculation of the estimated supercharged pressure will now be described with reference to a block diagram of FIG. 4. The estimated supercharged pressure cPC is calculated in compliance with the following formula from a ratio PCgain= $PCave_{(new)}/PCave_{(old)}$ of the latest value and the previous value of the real supercharged pressure PCave, which were detected by the supercharged pressure sensor 14 and from which noise has been removed. That is, if it is presumed that the estimated supercharged pressure cPC varies at the same rate as the real supercharged pressure PCave, then, $$PCave_{(new)} - PCave_{(old)}/PCave_{(new)} = (cPC_{(new)} - cPC_{(old)})/cPC_{(new)}$$

$$cPC_{(new)} = cPC_{(old)} \times PCave_{(new)}/PCave_{(old)} = cPC_{(old)} \times PCgain.$$

Here, an initial value of the estimated supercharged pressure cPC is the target supercharged pressure tPC. That is, the estimated supercharged pressure cPC is a supercharged pressure estimated to be a value to vary at the same rate as the real supercharged pressure with the target supercharged pressure tPC of before being changed as an initial value.

Then, the target supercharged pressure tPC calculated in the same manner as in the first control is divided by the estimated supercharged pressure cPC to calculate a supercharged pressure correction value ηp. Hereinafter, the intake air amount is corrected by correcting the throttle valve opening degree while correcting the target supercharged pressure by using the supercharged pressure correction value ηp, in the same manner as the first control.

When the transience correction is executed depending upon the difference between the estimated supercharged pressure cPC instead of the real supercharged pressure and the target supercharged pressure tPC as in the second control, since there occurs no steady deviation between the estimated supercharged pressure cPC and the target supercharged pressure tPC despite the atmospheric pressure decreases, there is no necessity of the correction of the throttle valve opening degree due to the correction of the target supercharged pressure relative to the steady deviation Therefore, the range for controlling the throttle valve by the driver is not narrowed, and a favorable operability is maintained (control range by the driver is maintained such that the output becomes a maximum at a maximum accelerator opening degree).

In the second control, too, it is preferable to calculate the deviation between the estimated supercharged pressure and the target supercharged pressure and to inhibit the correction of the target supercharged pressure when the deviation is equal to or smaller than a predetermined value, in order to avoid frequent correction operation of the throttle valve caused by the pulsation in the turbine and pulsation in the suction and, hence, to prevent the durability deterioration of the electronically controlled throttle valve.

In the foregoing embodiment, the supercharged pressure correction value was calculated based upon a ratio of the target supercharged pressure to the real supercharged pressure. However, the supercharged pressure correction value may be calculated depending upon a deviation between the target supercharged pressure and the real supercharged pressure. Further, the charger was a variable-capacity turbo charger. However, the charger may be the one in which the supercharged pressure is changed over by a waste gate valve. A great effect is exhibited when the invention is applied to an exhaust gas turbo charger which develops a large turbo lag. The effect is also exhibited even when the invention is applied to a supercharger.

Although the present invention has been described above with reference to the embodiments described above, the invention is not limited thereto. Modifications and variations of the embodiments described above are possible to those skilled in the art, in light of the above teaching. The scope of the invention is defined with reference to the following claims.

What is claimed is:

1. An intake air control device of an engine with a charger, in which a throttle valve of which opening degree is electronically controlled to a target opening degree and the charger on the upstream side of said throttle valve are installed in an intake passage of the engine; comprising:
   a target supercharged pressure setting means for setting a target supercharged pressure of said charger;
   a supercharged pressure detecting means for detecting a supercharged pressure on the upstream side of the throttle valve;
   a target supercharged pressure correction means for correcting the target supercharged pressure in a direction of eliminating a delay in an intake air amount based upon a difference between said target supercharged pressure that has been set and the real supercharged pressure that is detected; and
   a target opening degree setting means for setting a target opening degree of said electronically controlled throttle valve based on the corrected target supercharged pressure.

2. An intake air control device of an engine with a charger according to claim 1, wherein the correction of the target supercharged pressure is stopped when the difference between the target supercharged pressure and the actual supercharged pressure becomes equal to or smaller than a set value.

3. An intake air control device of an engine with a charger according to claim 1, wherein the combustion system of the engine is changed over from/to the homogeneous combustion to/from the stratified charge combustion depending upon operation conditions.

4. An intake air control device of an engine with a charger according to claim 1, wherein said target supercharged pressure before being corrected is set based upon the engine load and the engine rotational speed.

5. An intake air control device of an engine with a charger according to claim 1, wherein said target supercharged pressure before being corrected is set by delaying a basic target supercharged pressure obtained from engine operating conditions.

6. An intake air control device of an engine with a charger, in which a throttle valve of which opening degree is electronically controlled to a target opening degree and the charger on the upstream side of said throttle valve are installed in an intake passage of the engine; comprising
   a target supercharged pressure setting means for setting a target supercharged pressure of said charger;
   a supercharged pressure detecting means for detecting a supercharged pressure on the upstream side of the throttle valve;
   a target supercharged pressure correction means for calculating an estimated supercharged pressure based upon a change rate of the real supercharged pressure that is detected and for correcting the target supercharged pressure based upon a difference between said target supercharged pressure and said estimated supercharged pressure; and
   a target opening degree setting means for setting a target opening degree of said electronically controlled throttle valve based on the corrected target supercharged pressure.

7. An intake air control device of an engine with a charger according to claim 6, wherein the correction of said target supercharged pressure is stopped when the difference between said target supercharged pressure and said estimated supercharged pressure becomes equal to or smaller than a set value.

8. An intake air control device of an engine with a charger according to claim 6, wherein the combustion system of the engine is changed over from/to the homogeneous combustion to/from the stratified charge combustion depending upon operation conditions.

9. An intake air control device of an engine with a charger according to claim 6, wherein said target supercharged pressure before being corrected is set based upon the engine load and the engine rotational speed.

10. An intake air control device of an engine with a charger according to claim 6, wherein said target supercharged pressure before being corrected is set by delaying a basic target supercharged pressure obtained from engine operating conditions.

11. An intake air control method of an engine with a charger, in which an intake passage of the engine is provided with a throttle valve which is electronically controlled to a target opening degree and the charger on the upstream side of said throttle valve, wherein a target supercharged pressure of said charger is set, the supercharged pressure on the upstream side of the throttle valve is detected, the target supercharged pressure is corrected in a direction of eliminating a delay in the intake air amount based upon a difference between the target supercharged pressure that has been set and the real supercharged pressure that is detected, and a target opening degree of said throttle valve is set based on the corrected target supercharged pressure.

12. An intake air control method of an engine with a charger according to claim 11, wherein said target supercharged pressure is corrected based upon a ratio between the target supercharged pressure and the real supercharged pressure.

13. An intake air control method of an engine with a charger according to claim 11, wherein said target supercharged pressure is corrected based upon a deviation between the target supercharged pressure and the real supercharged pressure.

14. An intake air control method of an engine with a charger according to claim 11, wherein the correction of said target supercharged pressure is stopped when the difference between the target supercharged pressure and the real supercharged pressure becomes equal to or smaller than a set value.

15. An intake air control method of an engine with a charger according to claim 11, wherein said target supercharged pressure is corrected based upon a difference between the target supercharged pressure and an estimated supercharged pressure calculated based upon a change rate of the real supercharged pressure.

16. An intake air control method of an engine with a charger according to claim 15, wherein the correction of the target supercharged pressure is stopped when a difference between said target supercharged pressure that has been set and the estimated supercharged pressure becomes equal to or smaller than a set value.

17. An intake air control method of an engine with a charger according to claim 11, wherein said method is applied to an engine of which combustion system is changed over to the homogeneous combustion or to the stratified charge combustion depending upon the operation conditions, and wherein the target supercharged pressure before being corrected is set for every combustion system.

18. A method of controlling the intake of an engine with a charger according to claim 11, wherein the target supercharged pressure of before being corrected is set based upon the engine load and the engine rotational speed.

19. A method of controlling the intake of an engine with a charger according to claim 11, wherein the target supercharged pressure of before being corrected is set by delaying a basic target supercharged pressure obtained from the engine operation conditions.

* * * * *